US009431019B2

(12) United States Patent
Kuntz et al.

(10) Patent No.: US 9,431,019 B2
(45) **Date of Patent: *Aug. 30, 2016**

(54) APPARATUS FOR DECODING A SIGNAL COMPRISING TRANSIENTS USING A COMBINING UNIT AND A MIXER

(71) Applicant: Fraunhofer-Gesellschaft zur Foerderung der angewandten Forschung e.V., Munich (DE)

(72) Inventors: Achim Kuntz, Hemhofen (DE); Sascha Disch, Fuerth (DE); Juergen Herre, Buckenhof (DE); Fabian Kuech, Erlangen (DE); Johannes Hilpert, Nuernberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 371 days.

This patent is subject to a terminal disclaimer.

(21) Appl. No.: 13/774,913

(22) Filed: Feb. 22, 2013

(65) Prior Publication Data

US 2013/0173273 A1 Jul. 4, 2013

Related U.S. Application Data

(63) Continuation of application No. PCT/EP2011/061360, filed on Jul. 6, 2011.

(60) Provisional application No. 61/376,980, filed on Aug. 25, 2010.

(51) Int. Cl.

*G06F 17/00* (2006.01)
*G10L 19/00* (2013.01)

(Continued)

(52) U.S. Cl.

CPC ......... *G10L 19/0017* (2013.01); *G10L 19/008* (2013.01); *G10L 19/025* (2013.01)

(58) Field of Classification Search

CPC ........................... G10L 19/008; G10L 19/025

See application file for complete search history.

(56) References Cited

U.S. PATENT DOCUMENTS

| | | | |
|---|---|---|---|
| 7,602,922 | B2 | 10/2009 | Breebaart et al. |
| 7,809,089 | B2 | 10/2010 | Kuroyanagi et al. |

(Continued)

FOREIGN PATENT DOCUMENTS

| | | | |
|---|---|---|---|
| CN | 1256851 | A | 6/2000 |
| DE | 102007018032 | A1 | 10/2008 |

(Continued)

OTHER PUBLICATIONS

Engdegard, Jonas et al., "Synthetic ambience in parametric stereo coding", 116th AES Convention, Berlin, DE; XP002347433, May 2004, Total of 12 pages.

(Continued)

*Primary Examiner* — Joseph Saunders, Jr.

(74) *Attorney, Agent, or Firm* — Perkins Coie LLP; Michael A. Glenn

(57) ABSTRACT

An apparatus for generating a decorrelated signal including a transient separator, a transient decorrelator, a second decorrelator, a combining unit and a mixer, wherein the transient separator is adapted to separate an input signal into a first signal component and into a second signal component such that the first signal component includes transient signal portions of the input signal and such that the second signal component includes non-transient signal portions of the input signal. The combining unit and the mixer are arranged so that a decorrelated signal from a combination unit is fed into the mixer as an input signal.

14 Claims, 10 Drawing Sheets

(51) Int. Cl.

| | |
|---|---|
| ***G10L 19/008*** | (2013.01) |
| *G10L 19/025* | (2013.01) |

(56) References Cited

U.S. PATENT DOCUMENTS

| | | | | |
|---|---|---|---|---|
| 8,184,817 | B2 | 5/2012 | Takagi et al. | |
| 8,831,931 | B2 * | 9/2014 | Kuntz et al. | 704/200.1 |
| 2006/0165184 | A1 | 7/2006 | Purnhagen et al. | |
| 2007/0140499 | A1 | 6/2007 | Davis | |
| 2008/0033732 | A1 | 2/2008 | Seefeldt et al. | |
| 2009/0287495 | A1 | 11/2009 | Breebaart et al. | |
| 2009/0299756 | A1 | 12/2009 | Davis et al. | |
| 2009/0326959 | A1 | 12/2009 | Herre et al. | |
| 2010/0014679 | A1 | 1/2010 | Kim et al. | |

FOREIGN PATENT DOCUMENTS

| | | | |
|---|---|---|---|
| EP | 2144229 | | 1/2010 |
| JP | 2005522721 | A | 7/2005 |
| JP | 2007-526522 | | 9/2007 |
| JP | 2009-531724 | | 9/2009 |
| JP | 2013-539553 | | 10/2013 |
| JP | 2013-539554 | | 10/2013 |
| RU | 2369982 | C2 | 10/2009 |
| RU | 2389135 | C2 | 5/2010 |
| WO | 2004072956 | | 8/2004 |
| WO | WO-2007081166 | | 7/2007 |
| WO | WO-2007109338 | | 9/2007 |
| WO | WO-2008/125322 | | 10/2008 |
| WO | WO-2009/010116 | | 1/2009 |
| WO | WO-2009046223 | | 4/2009 |
| WO | 2009084920 | A1 | 7/2009 |
| WO | WO-2009/102750 | | 8/2009 |
| WO | 2009116280 | A1 | 9/2009 |
| WO | 2010017967 | A1 | 2/2010 |

OTHER PUBLICATIONS

Fielder, L. D. , "Introduction to Dolby Digital Plus, an Enhancement to the Dolby Digital Coding System", AES 117th Convention, Convention Paper 6196, XP040506945, San Francisco, CA, US, Oct. 28-31, 2004, 29 pages.

* cited by examiner (STATE OF THE ART)

(STATE OF THE ART)

APPARATUS FOR DECODING A SIGNAL COMPRISING TRANSIENTS USING A COMBINING UNIT AND A MIXER

CROSS-REFERENCE TO RELATED APPLICATIONS

This application is a continuation of copending International Application No. PCT/EP2011/061360, filed Jul. 6, 2011, which is incorporated herein by reference in its entirety, and additionally claims priority from U.S. Application No. 61/376,980, filed Aug. 25, 2010, which is also incorporated herein by reference in its entirety.

The present invention relates to the field of audio processing and audio decoding, in particular to decoding a signal comprising transients.

BACKGROUND OF THE INVENTION

Audio processing and/or decoding has advanced in many ways. In particular, spatial audio applications have become more and more important. Audio signal processing is often used to decorrelate or render signals. Moreover, decorrelation and rendering of signals is employed in the process of mono-to-stereo-upmix, mono/stereo to multi-channel upmix, artificial reverberation, stereo widening or user interactive mixing/rendering.

Several audio signal processing systems employ decorrelators. An important example is the application of decorrelating systems in parametric spatial audio decoders to restore specific decorrelation properties between two or more signals that are reconstructed from one or several downmix signals. The application of decorrelators significantly improves the perceptual quality of the output signal, e.g., when compared to intensity stereo. Specifically, the use of decorrelators enables the proper synthesis of spatial sound with a wide sound image, several concurrent sound objects and/or ambience. However, decorrelators are also known to introduce artifacts like changes in temporal signal structure, timbre, etc.

Other application examples of decorrelators in audio processing are, e.g., the generation of artificial reverberation to change the spatial impression or the use of decorrelators in multichannel acoustic echo cancellation systems to improve the convergence behavior.

A typical state of the art application of a decorrelator in a mono to stereo up-mixer, e.g. applied in Parametric Stereo (PS), is illustrated in FIG. 1, where a mono input signal M (a "dry" signal) is provided to a decorrelator 110. The decorrelator 110 decorrelates the mono input signal M according to a decorrelation method to provide a decorrelated signal D (a "wet" signal) at its output. The decorrelated signal D is fed into a mixer 120 as a first mixer input signal along with the dry mono signal M as a second mixer input signal. Furthermore an up-mix control unit 130 feeds up-mix control parameters into the mixer 120. The mixer 120 then generates two output channels L and R (L=left stereo output channel; R=right stereo output channel) according to a mixing matrix H. The coefficients of the mixing matrix can be fixed, signal dependent or controlled by a user.

Alternatively, the mixing matrix is controlled by side information that is transmitted along with the downmix containing a parametric description on how to up-mix the signals of the downmix to form the desired multi-channel output. This spatial side information is usually generated during the mono downmix process in an accordant signal encoder.

This principle is widely applied in spatial audio coding, e.g. Parametric Stereo, see, for example, J. Breebaart, S. van de Par, A. Kohlrausch, E. Schuijers, "High-Quality Parametric Spatial Audio Coding at Low Bitrates" in Proceedings of the AES 116th Convention, Berlin, Preprint 6072, May 2004.

A further typical state of the art structure of a parametric stereo decoder is illustrated in FIG. 2, wherein a decorrelation process is performed in a transform domain. An analysis filterbank 210 transforms a mono input signal into a transform domain, for example into a frequency domain. Decorrelation of the transformed mono input signal M is then performed by a decorrelator 220 which generates a decorrelated signal D. Both the transformed mono input signal M and the decorrelated signal D are fed into a mixing matrix 230. The mixing matrix 230 then generates two output signals L and R taking upmix parameters into account, which are provided by parameter modification unit 240, which is provided with spatial parameters and which is coupled to a parameter control unit 250. In FIG. 2, the spatial parameters can be modified by a user or additional tools, e.g., post-processing for binaural rendering/presentation. In this example, the up-mix parameters are combined with the parameters from the binaural filters to form the input parameters for the up-mix matrix. Finally, the output signals generated by the mixing matrix 230 are fed into a synthesis filterbank 260, which determines the stereo output signal.

The output L/R of the mixing matrix 230 is computed from the mono input signal M and the decorrelated signal D according to a mixing rule, e.g. by applying the following formula:

$$\begin{bmatrix} L \\ R \end{bmatrix} = \begin{bmatrix} h_{11} & h_{12} \\ h_{21} & h_{22} \end{bmatrix} \begin{bmatrix} M \\ D \end{bmatrix}$$

In the mixing matrix, the amount of decorrelated sound fed to the output is controlled on the basis of transmitted parameters, e.g., Inter-Channel Correlation/Coherence (ICC) and/or fixed or user-defined settings.

Conceptually, the output signal of the decorrelator output D replaces a residual signal that would ideally allow for a perfect decoding of the original L/R signals. Utilizing the decorrelator output D instead of a residual signal in the upmixer results in a saving of bit rate that might otherwise have been used for transmitting the residual signal. The aim of the decorrelator is thus to generate a signal D from the mono signal M, which exhibits similar properties as the residual signal that is replaced by D.

Correspondingly, on the encoder side, two types of spatial parameters are extracted: A first group of parameters comprises correlation/coherence parameters (e.g., ICCs=Inter-Channel Correlation/Coherence parameters) representing the coherence or cross correlation between two input channels that shall be encoded. A second group of parameters comprises level difference parameters (e.g., ILDs=Inter Channel Level Difference parameters) representing the level difference between the two input channels.

Furthermore, a downmix signal is generated by downmixing the two input channels. Moreover a residual signal is generated. Residual signals are signals which can be used to regenerate the original signals by additionally employing the downmix signal and an upmix matrix. When, for example, N signals are downmixed to 1 signal, the downmix is typically 1 of the N components which result from the mapping of the N input signals. The remaining components resulting from the mapping (e.g., N−1 components) are the residual signals and allow reconstructing the original N signals by an inverse mapping. The mapping may, for example, be a rotation. The mapping shall be conducted such that the downmix signal is maximized and the residual signals are minimized, e.g., similar as a principal axis transformation. E.g., the energy of the downmix signal shall be maximized and the energies of the residual signals shall be minimized. When downmixing 2 signals to 1 signal, the downmix is normally one of the two components which result from the mapping of the 2 input signals. The remaining component resulting from the mapping is the residual signal and allows reconstructing the original 2 signals by an inverse mapping.

In some cases, the residual signal may represent an error associated with representing the two signals by their downmix and associated parameters. For example, the residual signal may be an error signal which represents the error between original channels L, R and channels L', R', resulting from upmixing the downmix signal that was generated based on the original channels L and R.

In other words, a residual signal can be considered as a signal in the time domain or a frequency domain or a subband domain, which together with the downmix signal alone or with the downmix signal and parametric information allows a correct or nearly correct reconstruction of an original channel. Nearly correct has to be understood that the reconstruction with the residual signal having an energy greater than zero is closer to the original channel compared to a reconstruction using the downmix without the residual signal or using the downmix and the parametric information without the residual signal.

Considering MPEG Surround (MPS), structures similar to PS termed One-To-Two boxes (OTT boxes) are employed in spatial audio decoding trees. This can be seen as a generalization of the concept of mono-to-stereo upmix to multichannel spatial audio coding/decoding schemes. In MPS, two-to-three upmix systems (TTT boxes) also exist that may apply decorrelators depending on the TTT mode of operation. Details are described in J. Herre, K. Kjörling, J. Breebaart, et al., "MPEG surround—the ISO/MPEG standard for efficient and compatible multi-channel audio coding," in Proceedings of the 122th AES Convention, Vienna, Austria, May 2007.

Regarding Directional Audio Coding (DirAC), DirAC relates to a parametric sound field coding scheme that is not bound to a fixed number of audio output channels with fixed loudspeaker positions. DirAC applies decorrelators in the DirAC renderer, i.e., in the spatial audio decoder to synthesize non-coherent components of sound fields. More information relating to directional audio coding can be found in Pulkki, Ville: "Spatial Sound Reproduction with Directional Audio Coding," in J. Audio Eng. Soc., Vol. 55, No. 6, 2007.

Regarding state of the art decorrelators in spatial audio decoders, reference is made to ISO/IEC International Standard "Information Technology—MPEG audio technologies—Part 1: MPEG Surround", ISO/IEC 23003-1:2007 and also to J. Engdegard, H. Purnhagen, J. Röden, L. Liljeryd, "Synthetic Ambience in Parametric Stereo Coding" in Proceedings of the AES 116th Convention, Berlin, Preprint, May 2004. IIR lattice allpass structures are used as decorrelators in spatial audio decoders like MPS as described in J. Herre, K. Kjörling, J. Breebaart, et al., "MPEG surround—the ISO/MPEG standard for efficient and compatible multi-channel audio coding," in Proceedings of the 122th AES Convention, Vienna, Austria, May 2007, and as described in ISO/IEC International Standard "Information Technology—MPEG audio technologies—Part 1: MPEG Surround", ISO/IEC 23003-1:2007. Other state of the art decorrelators apply (potentially frequency dependent) delays to decorrelate signals or convolve the input signals, e.g., with exponentially decaying noise bursts. For an overview of state of the art decorrelators for spatial audio upmix systems, see "Synthetic Ambience in Parametric Stereo Coding" in Proceedings of the AES 116th Convention, Berlin, Preprint, May 2004.

Another technique of processing signals is "semantic upmix processing". Semantic upmix processing is a technique to decompose signals into components with different semantic properties (i.e., signal classes) and apply different upmix strategies to the different signal components. The different upmix algorithms can be optimized according to the different semantic properties in order to improve the overall signal processing scheme. This concept is described in WO/2010/017967, An apparatus for determining a spatial output multichannel-channel audio signal, International patent application, PCT/EP2009/005828, 11 Aug. 2009, 11 Jun. 2010 (FH090802PCT).

A further spatial audio coding scheme is the "temporal permutation method", as described in Hotho, G., van de Par, S., and Breebaart, J.: "Multichannel coding of applause signals", EURASIP Journal on Advances in Signal Processing, January 2008, art. 10. DOI=http://dx.doi.org/10.1155/2008/. In this document, a spatial audio coding scheme is proposed that is tailored to the coding/decoding of applause-like signals. This scheme relies on the perceptual similarity of segments of a monophonic audio signal, esp. a downmix signal of a spatial audio coder. The monophonic audio signal is segmented into overlapping time segments. These segments are temporarily permuted pseudo randomly (mutually independent for n output channels) within a "super"-block to form the decorrelated output channels.

A further spatial audio coding technique is the "temporal delay and swapping method". In DE 10 2007 018032 A: 20070417, Erzeugung dekorrelierter Signale, 17 Apr. 2007, 23 Oct. 2008 (FH070414PDE), a scheme is proposed that is also tailored to the coding/decoding of applause-like signals for binaural presentation. This scheme also relies on the perceptual similarity of segments of a monophonic audio signal and delays on output channels with respect to the other one. In order to avoid a localization bias towards the leading channel, leading and lagging channel are swapped periodically.

In general, stereo or multichannel applause-like signals coded/decoded in parametric spatial audio coders are known to result in reduced signal quality (see, for example, Hotho, G., van de Par, S., and Breebaart, J.: "Multichannel coding of applause signals", EURASIP Journal on Advances in Signal Processing, January 2008, art. 10. DOI=http://dx-.doi.org/10.1155/2008/531693, see also DE 10 2007 018032 A). Applause-like signals are characterized by containing temporarily dense mixtures of transients from different directions. Examples for such signals are applause, the sound of rain, galloping horses, etc. Applause-like signals often also contain sound components from distant sound sources, that are perceptually fused into a noise-like, smooth, background sound field.

State of the art decorrelation techniques employed in spatial audio decoders like MPEG Surround contain lattice allpass structures. These act as artificial reverb generators and are consequently well suited for generating homogeneous, smooth, noise-like, immersive sounds (like room reverberation tails). However, there are examples of sound fields with a non-homogeneous spatio-temporal structure that are still immersing the listener: one prominent example are applause-like sound fields that create listener-envelopment not only by homogeneous noise-like fields, but also by rather dense sequences of single claps from different directions. Hence, the non-homogeneous component of applause sound fields may be characterized by a spatially distributed mixture of transients. Obviously, these distinct claps are not homogeneous, smooth and noise-like at all.

Due to their reverb-like behavior, lattice allpass decorrelators are incapable of generating immersive sound field with the characteristics, e.g., of applause. Instead, when applied to applause-like signals, they tend to temporarily smear the transients in the signals. The undesired result is a noise-like immersive sound field without the distinctive spatio-temporal structure of applause-like sound fields. Further, transient events like a single handclap might evoke ringing artifacts of the decorrelator filters.

A system according to Hotho, G., van de Par, S., and Breebaart, J.: "Multichannel coding of applause signals", EURASIP Journal on Advances in Signal Processing, January 2008, art. 10. DOI=http://dx.doi.org/10.1155/2008/531693, will exhibit perceivable degradation of the output sound due to a certain repetitive quality in the output audio signal. This is because of the fact that one and the same segment of the input signal appears unaltered in every output channel (though at a different point in time). Furthermore, to avoid increased applause density, some original channels have to be dropped in the upmix and thus some important auditory event might be missed in the resulting upmix. The method is only applicable if it is possible to find signal segments that share the same perceptual properties, i.e.: signal segments that sound similar. The method in general heavily changes the temporal structure of the signals, which might be acceptable only for very few signals. In the case of applying the scheme to non-applause-like signals (e.g., due to signal misclassification), the temporal permutation will most often lead to unacceptable results. The temporal permutation further limits the applicability to cases where several signal segments may be mixed together without artifacts like echoes or comb-filtering. Similar drawbacks apply to the method described in DE 10 2007 018032 A.

The semantic upmix processing described in WO/2010/017967 separates the transient components of signals prior to the application of decorrelators. The remaining (transient-free) signal is fed to the conventional decorrelation and upmix processor, whereas the transient signals are handled differently: the latter are (e.g., randomly) distributed to different channels of the stereo or multichannel output signal by application of amplitude panning techniques. The amplitude panning shows several disadvantages:

Amplitude panning does not necessarily produce an output signal that is close to the original. The output signal may be only close to the original if the distribution of the transients in the original signal can be described by amplitude panning laws. I.e.: The amplitude panning can only reproduce purely amplitude panned events correctly, but no phase or time differences between the transient components in different output channels.

Moreover, application of the amplitude panning approach in MPS would involve bypassing not only the decorrelator but also the upmix matrix. Since the upmix matrix reflects the spatial parameters (inter channel correlations: ICCs, inter channel level differences: ILDs) that may be used for synthesizing an upmix output that shows the correct spatial properties, the panning system itself has to apply some rule to synthesize output signals with the correct spatial properties. A generic rule for doing so is not known. Further, this structure adds complexity since the spatial parameters have to be taken care of twice: once, for the non-transient part of the signal and, second, for the amplitude-panned transient part of the signal.

SUMMARY

According to an embodiment, an apparatus for decoding a signal may have: a transient separator for separating an apparatus input signal into a first signal component and into a second signal component such that the first signal component includes transient signal portions of the input signal and such that the second signal component includes non-transient signal portions of the input signal; a transient decorrelator for decorrelating the first signal component according to a first decorrelation method to acquire a first decorrelated signal component; a further second decorrelator for decorrelating the second signal component according to a second decorrelation method to obtain a second decorrelated signal component, wherein the second decorrelation method is different from the first decorrelation method; a combining unit for combining the first decorrelated signal component and the second decorrelated signal component to acquire a decorrelated combination signal; and a mixer, being adapted to receive mixer input signals and being adapted to generate output signals based on the mixer input signals and a mixing rule; wherein the combining unit and the mixer are arranged so that the decorrelated combination signal is fed into the mixer as a first mixer input signal and that the apparatus input signal or a signal derived from the apparatus input signal is fed into the mixer as a second mixer input signal.

According to another embodiment, a method for decoding a signal may have the steps of: separating an apparatus input signal into a first signal component and into a second signal component such that the first signal component includes transient signal portions of the apparatus input signal and such that the second signal component includes non-transient signal portions of the apparatus input signal; decorrelating the first signal component by a transient decorrelator according to a first decorrelation method to acquire a first decorrelated signal component; decorrelating the second signal component by a further second decorrelator according to a second decorrelation method to acquire a second decorrelated signal component, wherein the second decorrelation method is different from the first decorrelation method; combining the first decorrelated signal component and the second decorrelated signal component to acquire a decorrelated combination signal; and generating output signals based on a mixing rule, the decorrelated combination signal and the apparatus input signal.

Another embodiment may have a computer program implementing a method for decoding a signal, which method may have the steps of: separating an apparatus input signal into a first signal component and into a second signal component such that the first signal component includes transient signal portions of the apparatus input signal and such that the second signal component includes non-transient signal portions of the apparatus input signal; decorrelating the first signal component by a transient decorrelator according to a first decorrelation method to acquire a first decorrelated signal component; decorrelating the second signal component by a further second decorrelator according to a second decorrelation method to acquire a second decorrelated signal component, wherein the second decorrelation method is different from the first decorrelation method; combining the first decorrelated signal component and the second decorrelated signal component to acquire a decorrelated combination signal; and generating output signals based on a mixing rule, the decorrelated combination signal and the apparatus input signal.

An apparatus according to an embodiment comprises a transient separator for separating an input signal into a first signal component and into a second signal component such that the first signal component comprises transient signal portions of the input signal and such that the second signal component comprises non-transient signal portions of the input signal. The transient separator may separate the different signal components from each other to allow that signal components which comprise transients may be processed differently than signal components which do not comprise transients.

The apparatus furthermore comprises a transient decorrelator for decorrelating signal components comprising transients according to a decorrelation method which is particularly suited for decorrelating signal components comprising transients. Moreover, the apparatus comprises a second decorrelator for decorrelating signal components which do not comprise transients.

Thus, the apparatus is capable to either process signal components using a standard decorrelator or alternatively process signal components using the transient decorrelator particularly suited for processing transient signal components. In an embodiment, the transient separator decides whether a signal component is either fed into the standard decorrelator or into the transient decorrelator.

Furthermore, the apparatus may be adapted to separate a signal component such that the signal component is partially fed into the transient decorrelator and partially fed into the second decorrelator.

Moreover, the apparatus comprises a combining unit for combining the signal components outputted by the standard decorrelator and the transient decorrelator to generate a decorrelated combination signal.

In an embodiment, the apparatus comprises a mixer being adapted to receive input signals and moreover being adapted to generate output signals based on the input signals and on a mixing rule. An apparatus input signal is fed into a transient separator and afterwards decorrelated by a transient separator and/or a second decorrelator as described above. The combination unit and the mixer may be arranged so that the decorrelated combination signal is fed into the mixer as a first mixer input signal. A second mixer input signal may be the apparatus input signal or a signal derived from the apparatus input signal. As the decorrelation process is already completed when the decorrelated combination signal is fed into the mixer, transient decorrelation does not have to be taken into account by the mixer. Therefore, a conventional mixer may be employed.

In a further embodiment, the mixer is adapted to receive correlation/coherence parameter data indicating a correlation or coherence between two signals and is adapted to generate the output signals based on the correlation/coherence parameter data. In another embodiment, the mixer is adapted to receive level difference parameter data indicating an energy difference between two signals and is adapted to generate the output signals based on the level difference parameter data. In such an embodiment, the transient decorrelator, the second decorrelator and the combining unit do not have to be adapted to process such parameter data, as the mixer will take care of processing corresponding data. On the other hand, a conventional mixer with conventional correlation/coherence and level difference parameter processing may be employed in such an embodiment.

In an embodiment, the transient separator is adapted to either feed a considered signal portion of an apparatus input signal into the transient decorrelator or to feed the considered signal portion into the second decorrelator depending on transient separation information which either indicates that the considered signal portion comprises a transient or which indicates that the considered signal portion does not comprise a transient. Such an embodiment allows easy processing of transient separation information.

In another embodiment, the transient separator is adapted to partially feed a considered signal portion of an apparatus input signal into the transient decorrelator and to partially feed the considered signal portion into the second decorrelator. The amount of the considered signal portion that is fed into the transient separator and the amount of the considered signal portion that is fed into the second decorrelator depend on transient separation information. By this, the strength of a transient may be taken into account.

In a further embodiment, the transient separator is adapted to separate an apparatus input signal which is represented in a frequency domain. This allows frequency dependent transient processing (separation and decorrelation). Thus, certain signal components of a first frequency band may be processed according to a transient decorrelation method, while signal components of another frequency band may be processed according to another, e.g., conventional decorrelation method. Accordingly, in an embodiment the transient separator is adapted to separate an apparatus input signal based on frequency dependent transient separation information. However, in an alternative embodiment, the transient separator is adapted to separate an apparatus input signal based on frequency independent separation information. This allows more efficient transient signal processing.

In another embodiment, the transient separator may be adapted to separate an apparatus input signal which is represented in a frequency domain such that all signal portions of the apparatus input signal within a first frequency range are fed into the second decorrelator. An corresponding apparatus is therefore adapted to restrict transient signal processing to signal components with signal frequencies in a second frequency range, while no signal components with signal frequencies in the first frequency range are fed into the transient decorrelator (but instead into the second decorrelator).

In a further embodiment, the transient decorrelator may be adapted to decorrelate the first signal component by applying phase information representing a phase difference between a residual signal and a downmix signal. On the encoder side, a "reverse" mixing matrix may be employed to create a downmix signal and a residual signal, e.g., from the two channels of a stereo signal, as has been explained above. While the downmix signal may be transmitted to the decoder, the residual signal may be discarded. According to an embodiment, the phase difference employed by the transient decorrelator may be the phase difference between the residual signal and the downmix signal. It may thus be possible to reconstruct an "artificial" residual signal, by applying the original phase of the residual on the downmix. In an embodiment, the phase difference may relate to a certain frequency band, i.e., may be frequency dependent. Alternatively, a phase difference does not relate to certain frequency bands but may be applied as a frequency independent broadband parameter.

In an embodiment, the apparatus comprises a receiving unit for receiving phase information, wherein the transient decorrelator is adapted to apply the phase information to the first signal component. The phase information might be generated by a suitable encoder.

In a further embodiment a phase term might be applied to the first signal component by multiplying the phase term with the first signal component.

In a further embodiment, the second decorrelator may be a conventional decorrelator, e.g., a lattice IIR decorrelator.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
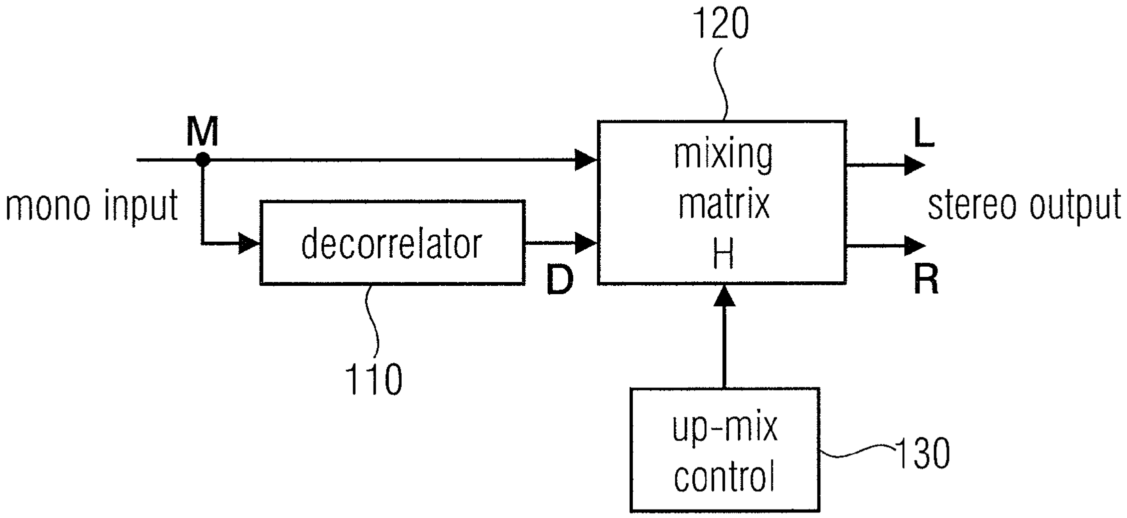
FIG. 1 illustrates a state of the art application of a decorrelator in a mono to stereo up-mixer.
Figure 2:
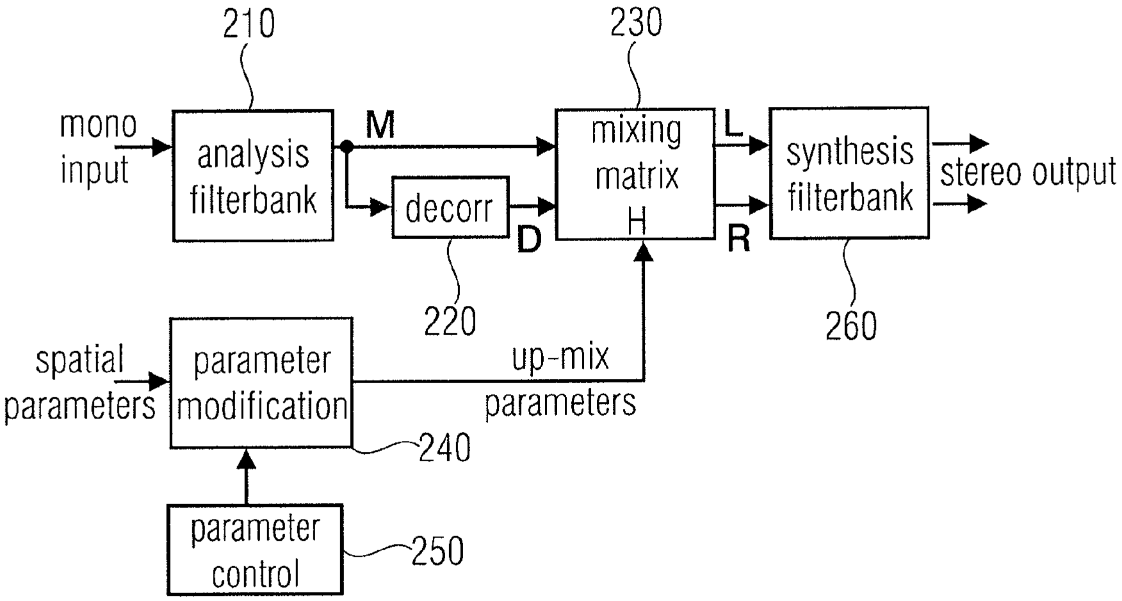
FIG. 2 depicts a further state of the art application of a decorrelator in a mono to stereo up-mixer.
Figure 3:
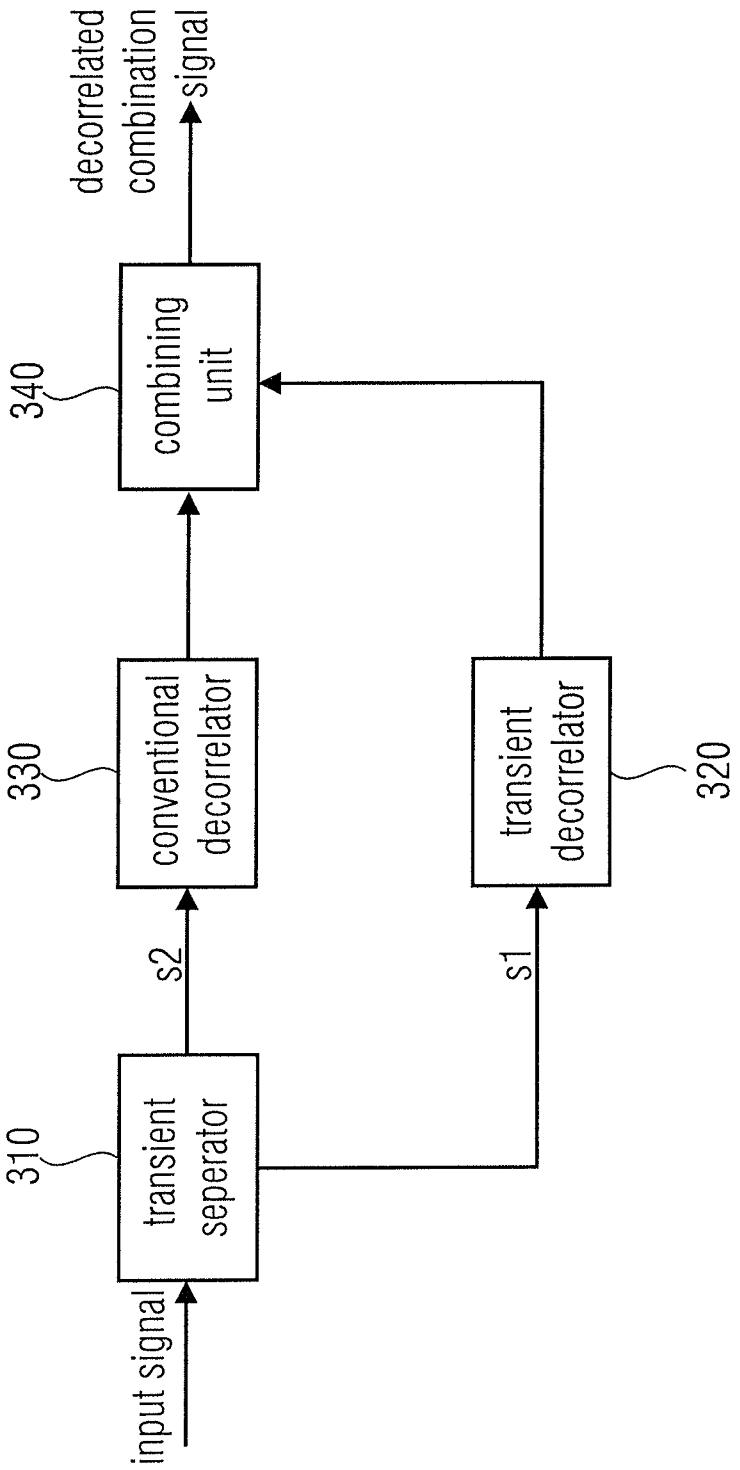
FIG. 3 illustrates an apparatus for generating a decorrelated signal according to an embodiment.

FIG. 3 illustrates an apparatus for generating a decorrelated signal according to an embodiment. The apparatus comprises a transient separator 310, a transient decorrelator 320, a conventional decorrelator 330 and a combination unit 340. The transient handling approach of this embodiment aims to generate decorrelated signals from applause-like audio signals, e.g., for the application in the upmix-process of spatial audio decoders.

In FIG. 3, an input signal is fed into a transient separator 310. The input signal may have been transformed to a frequency domain, e.g., by. applying a hybrid QMF filter bank. The transient separator 310 may decide for each considered signal component of the input signal whether it comprises a transient. Furthermore, the transient separator 310 may be arranged to feed the considered signal portion either into the transient decorrelator 320, if the considered signal portion comprises a transient (signal component s1), or it may feed the considered signal portion into the conventional decorrelator 330, if the considered signal portion does not comprise a transient (signal component s2). The transient separator 310 may also be arranged to split the considered signal portion depending on the existence of a transient in the considered signal portion and provide them partially to the transient decorrelator 320 and partially to the conventional decorrelator 330.

In an embodiment, the transient decorrelator 320 decorrelates signal component s1 according to a transient decorrelation method which is particularly suitable to decorrelate transient signal components. For example, the decorrelation of the transient signal components may be carried out by applying phase information, e.g., by applying phase terms. A decorrelation method where phase terms are applied on transient signal components is explained below with respect to the embodiment of FIG. 5. Such a decorrelation method may also be employed as a transient decorrelation method of the transient decorrelator 320 of the embodiment of FIG. 3.

Signal component s2, which comprises non-transient signal portions, is fed into the conventional decorrelator 330. The conventional deccorrelator 330 may then decorrelate signal component s2 according to a conventional decorrelation method, for example, by applying lattice allpass structures, e.g., a lattice IIR (infinite impulse response) filter.

After being decorrelated by the conventional decorrelator 330, the decorrelated signal component from the conventional decorrelator 330 is fed into the combining unit 340. The decorrelated transient signal component from the transient decorrelator 320 is also fed into the combining unit 340. The combining unit 340 then combines both decorrelated signal components, e.g. by adding both signal components, to obtain a decorrelated combination signal.

In general, a method decorrelating a signal comprising transients according to an embodiment may be conducted as follows:

In a separation step, the input signal is separated into two components: one component s1 comprises the transients of the input signal, another component s2 comprises the remaining (non-transient) part of the input signal. The non-transient component s2 of the signal may be processed like in systems without applying the decorrelation method of the transient decorrelator of this embodiment. I.e.: the transient-free signal s2 may be fed to one or several conventional decorrelating signal processing structures like lattice IIR allpass structures.

Moreover, the signal component comprising the transients (the transient stream s1) is fed to a "transient decorrelator" structure that decorrelates the transient stream while maintaining the special signal properties better than the conventional decorrelating structures. The decorrelation of the transient stream is carried out by applying phase information at a high temporal resolution. Advantageously, the phase information comprises phase terms. Furthermore, it is advantageous that the phase information may be provided by an encoder.

Furthermore, the output signals of both the conventional decorrelator and the transient decorrelator are combined to form the decorrelated signal which might be utilized in the upmix-process of spatial audio coders. The elements ($h_{11}$, $h_{12}$, $h_{21}$, $h_{22}$) of the mixing-matrix ($M_{mix}$) of the spatial audio decoder may remain unchanged.

Figure 4:
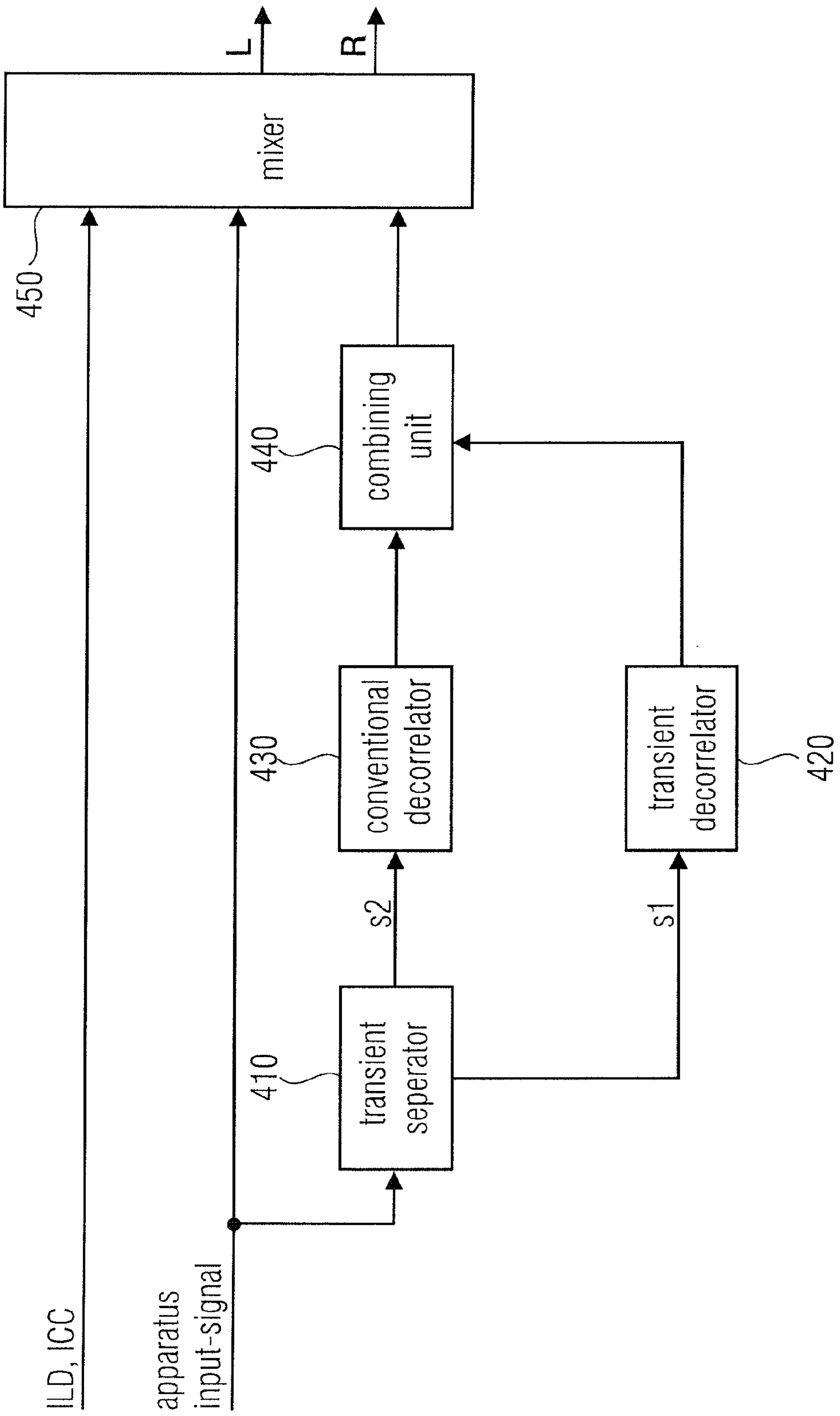
FIG. 4 illustrates an apparatus for decoding a signal according to an embodiment.

FIG. 4 illustrates an apparatus for decoding an apparatus input signal according to an embodiment, wherein the apparatus input signal is fed into the transient separator 410. The apparatus comprises the transient separator 410, a transient decorrelator 420, a conventional decorrelator 430, combining unit 440 and a mixer 450. The transient separator 410, the transient decorrelator 420, the conventional decorrelator 430 and the combining unit 440 of this embodiment may be similar to the transient separator 310, the transient decorrelator 320, the conventional decorrelator 330 and the combining unit 340 of the embodiment of FIG. 3, respectively. A decorrelated combination signal generated by the combining unit 440 is fed into a mixer 450 as a first mixer input signal. Furthermore, the apparatus input signal that has been fed into the transient separator 410 is also fed into the mixer 450 as a second mixer input signal. Alternatively, the apparatus input signal is not directly fed into the mixer 450, but a signal derived from the apparatus input signal is fed into the mixer 450. A signal may be derived from the apparatus input signal, for example, by applying a conventional signal processing method to the apparatus input signal, e.g. applying a filter. The mixer 450 of the embodiment of FIG. 4 is adapted to generate output signals based on the input signals and a mixing rule. Such a mixing rule may be, for example, to multiply the input signals and a mixing matrix, for example by applying the formula $$\begin{bmatrix} L \\ R \end{bmatrix} = \begin{bmatrix} h_{11} & h_{12} \\ h_{21} & h_{22} \end{bmatrix} \begin{bmatrix} M \\ D \end{bmatrix}$$

The mixer 450 may generate the output channels L, R on the basis of correlation/coherence parameter data, e.g., Inter-Channel Correlation/Coherence (ICC), and/or level difference parameter data, e.g., Inter Channel Level Difference (ILD). For example, the coefficients of a mixing matrix may depend on the correlation/coherence parameter data and/or the level difference parameter data. In the embodiment of FIG. 4, the mixer 450 generates the two output channels L and R. However, in alternative embodiments, the mixer may generate a plurality of output signals, for example 3, 4, 5, or 9 output signals, which may be surround sound signals.

Figure 5:
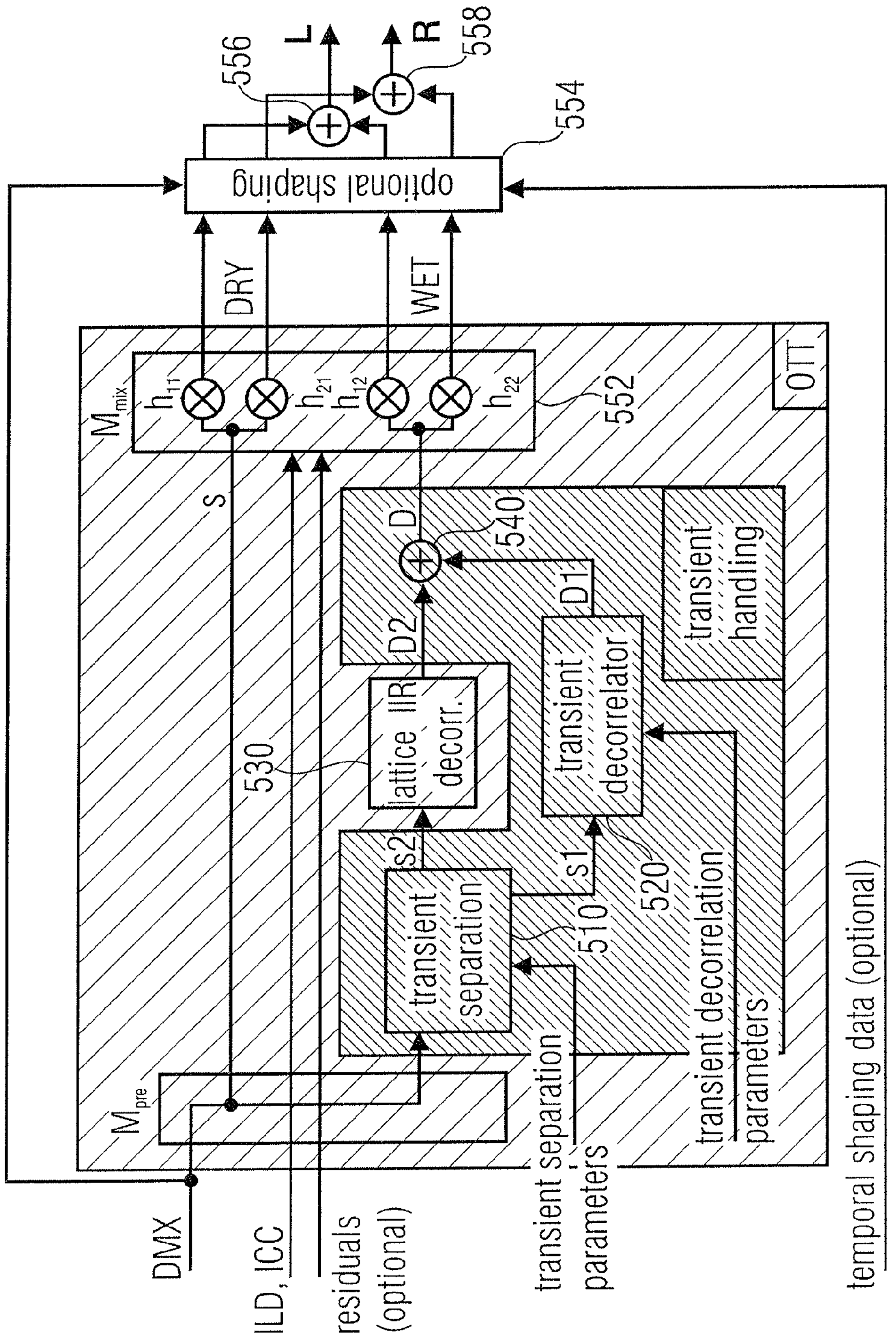
FIG. 5 is a one-to-two (OTT) system overview according to an embodiment.

FIG. 5 depicts a system overview of the transient handling approach in a 1-to-2 (OTT) upmix system of an embodiment, e.g., a 1-to-2 box of an MPS (MPEG Surround) spatial audio decoder. The parallel signal path for the separated transients according to an embodiment is comprised in the U-shaped transient handling box. An apparatus input signal DMX is fed into a transient separator 510. The apparatus input signal may be represented in a frequency domain. For example, a time domain input signal may have been transformed into a frequency domain by applying a QMF filter bank as used in MPEG Surround. The transient separator 510 may then feed the components of the apparatus input signal DMX into a transient decorrelator 520 and/or into a lattice IIR decorrelator 530. The components of the apparatus input signal are then decorrelated by the transient decorrelator 520 and/or the lattice IIR decorrelator 530. Afterwards, the decorrelated signal components D1 and D2 are combined by a combining unit 540, e.g., by adding both signal components, to obtain a decorrelated combination signal D. The decorrelated combination signal is fed into a mixer 552 as a first mixer input signal D. Furthermore, the apparatus input signal DMX (or alternatively: a signal derived from the apparatus input signal DMX) is also fed into the mixer 552 as a second mixer input signal. The mixer 552 then generates a first and a second "dry" signal, depending on the apparatus input signal DMX. The mixer 552 also generates a first and second "wet" signal depending on the decorrelated combination signal D. The signals, generated by the mixer 552 may also be generated based on transmitted parameters, e.g., correlation/coherence parameter data, e.g., Inter-Channel Correlation/Coherence (ICC), and/or level difference parameter data, e.g., Inter Channel Level Difference (ILD). In an embodiment, the signals generated by the mixer 552 may be provided to a shaping unit 554 which shapes the provided signals based on provided temporal shaping data. In other embodiments, no signal shaping takes place. The generated signals are then provided to a first 556 or second 558 adding unit which combine the provided signals to generate a first output signal L and a second output signal R, respectively.

The processing principles shown in FIG. 5 may be applied in mono-to-stereo upmix systems (e.g., stereo audio coders) as well as in multi-channel setups (e.g., MPEG Surround). In embodiments, the proposed transient handling scheme may be applied as an upgrade to existing upmix systems without large conceptual changes of the upmix system, since only a parallel decorrelator signal path is introduced without altering the upmix process itself.

Signal separation into the transient and non-transient component is controlled by parameters that might be generated in an encoder and/or the spatial audio decoder. The transient decorrelator 520 utilizes phase information, e.g., phase terms that might be obtained in an encoder or in the spatial audio decoder. Possible variants for obtaining transient handling parameters (i.e.: transient separation parameters like transient positions or separation strength and transient decorrelation parameters like phase information) are described below.

The input signal may be represented in a frequency domain. For example, a signal may have been transformed to a frequency domain by employing an analysis filter bank. A QMF filter bank may be applied to obtain a plurality of subband signals from a time domain signal.

For best perceptual quality, the transient signal processing may be advantageously restricted to signal frequencies in a limited frequency range. One example would be to limit the processing range to frequency band indices $k \geq 8$ of a hybrid QMF filter bank as used in MPS, similar to the frequency band limitation of guided envelope shaping (GES) in MPS.

In the following, embodiments of a transient separator 520 are explained in more detail. The transient separator 510 splits the input signal DMX into transient and non-transient components s1 and s2, respectively. The transient separator 510 may employ transient separation information for splitting the input signal DMX, for example a transient separation parameter β[n]. The splitting of the input signal DMX may be done in a way such that the sum of the component, s1+s2, equals the input signal DMX:

$$s1[n]=DMX[n]\cdot\beta[n]$$

$$s2[n]=DMX[n]\cdot(1-\beta[n])$$

where n is the time index of downsampled subband signals and valid values for the time variant transient separation parameter β[n] are in the range [0, 1]. β[n] may be a frequency independent parameter. A transient separator 510 which is adapted to separate an apparatus input signal based on a frequency independent separation parameter may feed all subband signal portions with time index n either to the transient decorrelator 520 or into the second decorrelator depending on the value of β[n].

Alternatively, β[n] may be a frequency dependent parameter. A transient separator 510 which is adapted to separate an apparatus input signal based on a frequency dependent transient separation information may process subband signal portions with the same time index differently, if their corresponding transient separation information differ.

Furthermore, the frequency dependency may, e.g., be used to limit the frequency range of the transient processing as mentioned in the section above.

In an embodiment, the transient separation information may be a parameter which either indicates that a considered signal portion of an input signal DMX comprises a transient or which indicates that the considered signal portion does not comprise a transient. The transient separator 510 feeds the considered signal portion into the transient decorrelator 520, if the transient separation information indicates that the considered signal portion comprises a transient. Alternatively, the transient separator 510 feeds the considered signal portion into the second decorrelator, e.g. the lattice IIR decorrelator 530, if the transient separation information indicates that the considered signal portion comprises a transient.

For example, a transient separation parameter β[n] may be employed as transient separation information which may be a binary parameter. n is the time index of a considered signal portion of the input signal DMX. β[n] may be either 1 (indicating that the considered signal portion shall be fed into the transient decorrelator) or 0 (indicating that the considered signal portion shall be fed into the second decorrelator). Restricting β[n] to $\beta \in \{0, 1\}$ results in hard transient/non-transient decisions, i.e.: components that are treated as transients are fully separated from the input (β=1).

In another embodiment, the transient separator 510 is adapted to partially feed a considered signal portion of the apparatus input signal into the transient decorrelator 520 and to partially feed the considered signal portion into the second decorrelator 530. The amount of the considered signal portion that is fed into the transient separator 520 and the amount of the considered signal portion that is fed into the second decorrelator 530 depends on transient separation information. In an embodiment, β[n] has to be in the range [0, 1]. In a further embodiment, β[n] may be restricted to $\beta[n] \in [0, \beta_{max}]$, where $\beta_{max} < 1$, results in a partial separation of the transients, leading to a less pronounced effect of the transient handling scheme. Therefore, changing $\beta_{max}$ allows to fade between the output of the conventional upmix processing without transient handling and the upmix processing including the transient handling.

In the following, a transient decorrelator 520 according to an embodiment is explained in more detail.

A transient decorrelator 520 according to an embodiment creates an output signal that is sufficiently decorrelated to the input. It does not alter the temporal structure of single claps/transients (no temporal smearing, no delay). Instead, it leads to a spatial distribution of the transient signal components (after the upmix process), which is similar to the spatial distribution in the original (non-coded) signal. The transient decorrelator 520 may allow for bit rate vs. quality trade-offs (e.g., fully random spatial transient distribution at low bitrate↔ close to the original (near-transparent) at high bit rate). Furthermore, this is achieved with low computational complexity.

As has been explained above, on the encoder side, a "reverse" mixing matrix may be employed to create a downmix signal and a residual signal, e.g., from the two channels of a stereo signal. While the downmix signal may be transmitted to the decoder, the residual signal may be discarded. According to an embodiment, the phase difference between the residual signal and the downmix signal may be determined, e.g., by an encoder, and may be employed by a decoder when decorrelating a signal. By this, it may then be possible to reconstruct an "artificial" residual signal, by applying the original phase of the residual on the downmix.

A corresponding decorrelation method of the transient decorrelator 520 according to an embodiment will be explained in the following:

According to a transient decorrelation method, a phase term may be employed. Decorrelation is achieved by simply multiplying the transient stream by phase terms at high temporal resolution, e.g., at subband signal time resolution in transform domain systems like MPS:

$$D1[n]=s1[n]\cdot e^{j\cdot\Delta\phi[n]}$$

In this equation, n is the time index of downsampled subband signals. Δϕ ideally reflects the phase difference between downmix and residual. Therefore, the transient residuals are replaced by a copy of the transients from the downmix, modified such that they exhibit the original phase.

Applying the phase information inherently results in a panning of the transients to the original position in the upmix process. As an illustrative example consider the case ICC=0, ILD=0: The transient part of the output signals then reads:

$$L[n]=c\cdot(s[n]+D1[n])=c\cdot s[n]\cdot(1+e^{j\cdot\Delta\phi[n]})$$

$$R[n]=c\cdot(s[n]-D1[n])=c\cdot s[n]\cdot(1-e^{j\cdot\Delta\phi[n]})$$

For Δϕ=0 this results in L=2c*s, R=0, whereas Δϕ=π leads to L=0, R=2c*s. Other values of Δϕ, ICC, and ILD lead to different level and phase relations between the rendered transients.

The Δϕ[n] values may be applied as frequency independent broadband parameters or as frequency dependent parameters. In case of applause-like signals without tonal components, broadband Δϕ[n] values may be advantageous due to lower data rate demands and consistent handling of broadband transients (consistency over frequency).

The transient handling structure of FIG. 5 is arranged such that only the conventional decorrelator 530 is bypassed regarding the transient signal components while the mixing matrix remains unaltered. Thus, the spatial parameters (ICC, ILD) are inherently also taken into account for the transient signals, e.g.: the ICC automatically controls the width of the rendered transient distribution.

Considering the aspect of how to obtain phase information, in an embodiment, phase information may be received from an encoder.

Figure 6:
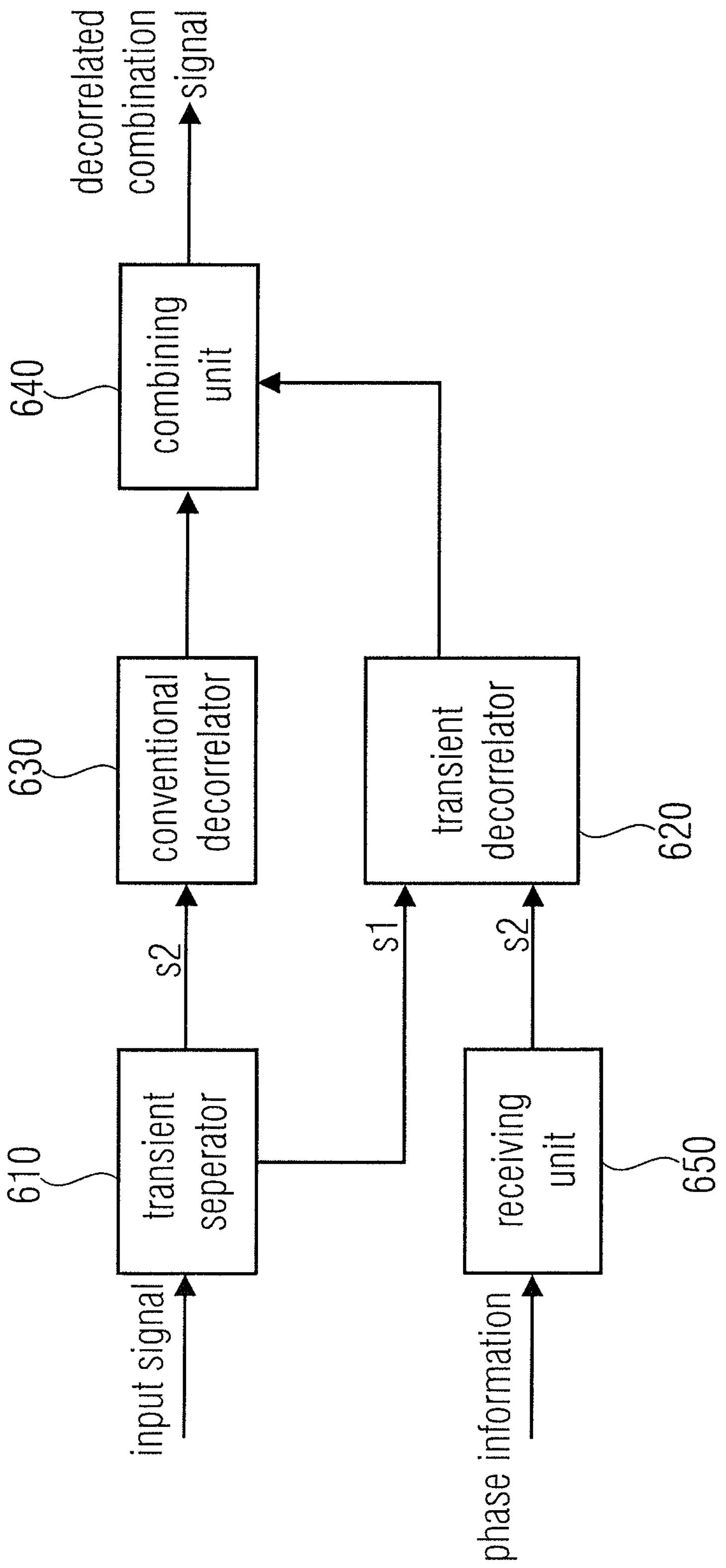
FIG. 6 illustrates an apparatus for generating a decorrelated signal comprising a receiving unit according to a further embodiment.

FIG. 6 illustrates an embodiment of an apparatus for generating a decorrelated signal. The apparatus comprises a transient separator 610, a transient decorrelator 620, a conventional decorrelator 630, a combining unit 640 and a receiving unit 650. The transient separator 610, the conventional decorrelator 630 and the combining unit 640 are similar to the transient separator 310, the conventional decorrelator 330 and the combining unit 340 of the embodiment shown in FIG. 3. However, FIG. 6 furthermore illustrates a receiving unit 650 which is adapted to receive phase information. The phase information may have been transmitted by an encoder (not shown). For example, an encoder may have computed the phase difference between residual and downmix signals (relative phase of the residual signal with respect to a downmix). The phase difference may have been calculated for certain frequency bands or broadband (e.g., in a time domain). The encoder may appropriately code the phase values by uniform or non-uniform quantization and potentially lossless coding. Afterwards, the encoder may transmit the coded phase values to the spatial audio decoding system. Obtaining the phase information from an encoder is advantageous as the original phase information is then available in a decoder (except for the quantization error).

The receiving unit 650 feeds the phase information into the transient decorrelator 620 which uses the phase information when it decorrelates a signal component. For example, the phase information may be a phase term and the transient decorrelator 620 may multiply a received transient signal component by the phase term.

In case of transmitting phase information $\Delta\phi[n]$ from the encoder to the decoder, the data rate that may be used can be reduced as follows:

The phase information $\Delta\phi[n]$ may be applied only to the transient signal components in the decoder. Therefore, the phase information only needs to be available in the decoder as long as there are transient components in the signal to be decorrelated. The transmission of the phase information can thus be limited by the encoder such that only the useful information is transmitted to the decoder. This can be done by applying a transient detection in the encoder as described below. Phase information $\Delta\phi[n]$ is only transmitted for points in time n, for which transients have been detected in the encoder.

Considering the aspect of transient separation, in an embodiment, transient separation may be encoder driven.

According to an embodiment, the transient separation information (also referred to as "transient information") may be obtained from an encoder. The encoder may apply transient detection methods as described in Andreas Walther, Christian Uhle, Sascha Disch "Using Transient Suppression in Blind Multi-channel Up-mix Algorithms," in Proc. 122nd AES Convention, Vienna, Austria, May 2007 either to the encoder input signals or to the downmix signals. The transient information is then transmitted to the decoder and advantageously obtained e.g., at the time resolution of downsampled subband signals.

The transient information may advantageously comprise a simple binary (transient/non-transient) decision for each signal sample in time. This information may advantageously also be represented by the transient positions in time and the transient durations.

The transient information may be losslessly coded (e.g., run-length coding, entropy coding) to reduce the data rate that may be used for transmitting the transient information from the encoder to the decoder.

The transient information may be transmitted as broadband information or as frequency dependent information at a certain frequency resolution. Transmitting the transient information as broadband parameters reduces the transient information data rate and potentially improves the audio quality due to consistent handling of broadband transients.

Instead of the binary (transient/non-transient) decision, also the strength of the transients may be transmitted, e.g., quantized in two or four steps. The transient strength may then control the separation of the transients in the spatial audio decoder as follows: Strong transients are fully separated from the IIR lattice decorrelator input, whereas weaker transients are only partially separated.

The transient information may only be transmitted, if the encoder detects applause-like signals, e.g., using applause detection systems as described in Christian Uhle, "Applause Sound Detection with Low Latency", in Audio Engineering Society Convention 127, New York, 2009.

The detection result for the similarity of the input signal to applause-like signals may also be transmitted at a lower time resolution (e.g., at the spatial parameters update rate in MPS) to the decoder to control the strength of the transient separation. The applause detection result may be transmitted as a binary parameter (i.e., as a hard decision) or as a non-binary parameter (i.e., as a soft decision). This parameter controls the separation-strength in the spatial audio decoder. Therefore, it allows to (hardly or gradually) switch on/off the transient handling in the decoder. This allows avoiding artifacts that might occur, e.g., when applying a broadband transient handling scheme to signals that contain tonal components.

Figure 7:
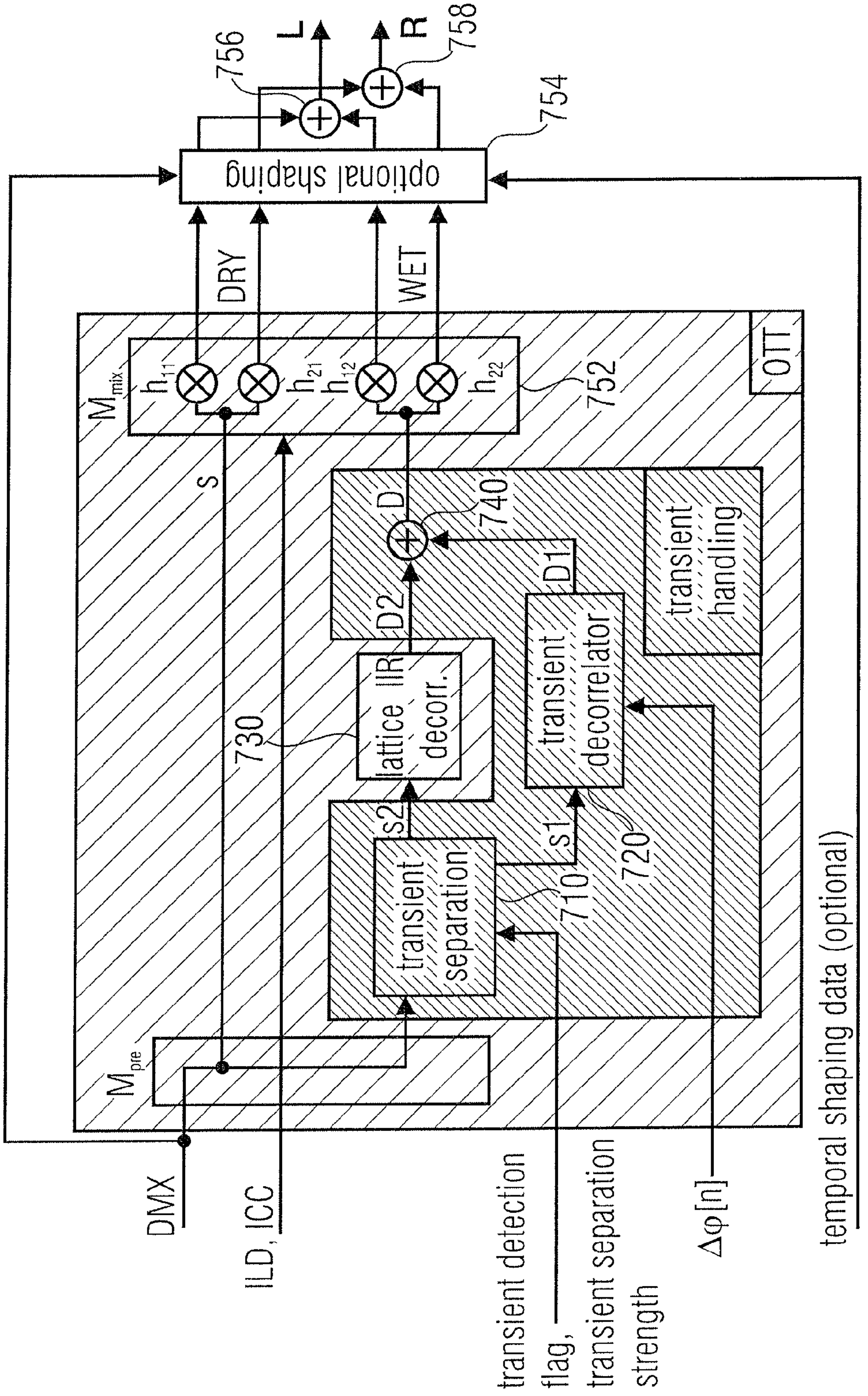
FIG. 7 is a one-to-two system overview according to another further embodiment.

FIG. 7 illustrates an apparatus for decoding a signal according to an embodiment. The apparatus comprises a transient separator 710, a transient decorrelator 720, a lattice IIR decorrelator 730, a combining unit 740, a mixer 752, an optional shaping unit 754, a first adding unit 756 and a second adding unit 758, which correspond to the transient separator 510, the transient decorrelator 520, the lattice IIR decorrelator 530, the combining unit 540, the mixer 552 the optional shaping unit 554, the first adding unit 556 and the second adding unit 558 of the embodiment of FIG. 5, respectively. In the embodiment of FIG. 7, an encoder obtains phase information and transient position information and transmits the information to an apparatus for decoding. No residual signals are transmitted. FIG. 7 illustrates a 1-to-2 upmix configuration like an OTT box in MPS. It may be applied in a stereo codec for upmixing from a mono downmix to a stereo output according to an embodiment. In the embodiment of FIG. 7, three transient handling parameters are transmitted as frequency independent parameters from the encoder to the decoder, as can be seen in FIG. 7:

A first transient handling parameter to be transmitted is the binary transient/non-transient decision of a transient detector running in the encoder. It is used to control the transient separation in the decoder. In a simple scheme, the binary transient/non-transient decision may be transmitted as a binary flag per subband time sample without further coding.

A further transient handling parameter to be transmitted is the phase value (or the phase values) $\Delta\phi[n]$ that is needed for the transient decorrelator. $\Delta\phi$ is only transmitted for times n, for which transients have been detected in the encoder. $\Delta\phi$ values are transmitted as indices of a quantizer with a resolution of, e.g. 3 bit per sample.

Another transient handling parameter to be transmitted is the separation strength (i.e., the effect strength of the transient handling scheme). This information is transmitted at the same temporal resolution as the spatial parameters ILD, ICC.

The bit rate BR that may be used for transmitting transient separation decisions and broadband phase information from the encoder to the decoder can be estimated for MPS-like systems as:

$$BR = BR_{transient\ separation\ flags} + BR_{\Delta\phi} \approx (f_s/64) + \sigma \cdot Q \cdot f_s/64 = (1+\sigma \cdot Q) \cdot f_s/64,$$

where $\sigma$ is the transient density (fraction of time slots (=subband time samples) that are marked as transients), Q is the number of bits per transmitted phase value, and $f_s$ is the sampling rate. Note that $(f_s/64)$ is the sampling rate of the downsampled subband signals.

$E\{\sigma\}<0.25$ has been measured for a set of several representative applause items, where $E\{\bullet\}$ denotes the mean over the item duration. A reasonable compromise between exactness of the phase values and parameter bit rate is Q=3. To reduce the parameter data rate, the ICCs and ILDs may be transmitted as broadband cues. The transmission of the ICCs and ILDs as broadband cues is especially applicable for non-tonal signals like applause.

Additionally, the parameters for signaling the separation strength are transmitted at the update rate of the ICCs/ILDs. For long spatial frames in MPS (32 times 64 samples) and 4-step quantized separation strengths, this results in an additional bit rate of $$BR_{transientseparationstrength} = (f_s/(64 \cdot 32)) \cdot 2.$$

The separation strength parameter may be derived in an encoder from the results of signal analysis algorithms that assess the similarity to applause-like signals, the tonality, or other signal characteristics that indicate potential benefits or problems when applying the transient decorrelation of the embodiment.

The transmitted parameters for transient handling may be subject to lossless coding to reduce redundancy, resulting in a lower parameter bit rate (e.g., run-length coding of transient separation information, entropy coding).

Returning to the aspect of obtaining phase information, in an embodiment, phase information may be obtained in a decoder.

In such an embodiment, the apparatus for decoding does not obtain phase information from an encoder, but may determine the phase information itself Therefore, it is not necessary to transmit phase information what results in a reduced overall transmission rate.

In an embodiment, phase information is obtained in an MPS based decoder from "Guided Envelope Shaping (GES)" data. This is only applicable if GES data is transmitted, i.e., if the GES feature is activated in an encoder. The GES feature is available e.g., in MPS systems. The ratio of GES envelope values between the output channels reflects panning positions for the transients at high time resolution. The GES envelope ratio (GESR) can be mapped to the phase information needed for the transient handling. In GES, the mapping may be performed according to a mapping rule obtained empirically from building statistics of the phase-relative-to-GESR-distribution for a representative set of appropriate test signals. Determining the mapping rule is a step for designing the transient handling system, not a run time process when applying the transient handling system. Therefore, it is advantageous that there is no need to spend additional transmission costs for the phase data if GES data is needed for the application of the GES feature anyway. Bitstream backward compatibility is achieved with MPS bitstreams/decoders. However, phase information extracted from GES data is not as exact (e.g.: the sign of the estimated phase is unknown) as the phase information that might be obtained in the encoder.

In a further embodiment, phase information may also be obtained in a decoder, but from transmitted non-fullband residuals. This is applicable, e.g., if band limited residual signals are transmitted (typically covering a frequency range up to a certain transition frequency) in an MPS coding scheme. In such an embodiment, the phase relation between the downmix and transmitted residual signal in the residual band(s) is calculated, i.e., for frequencies for which residual signals are transmitted. Furthermore, the phase information from the residual band(s) to the non-residual band(s) is extrapolated (and/or possibly interpolated). One possibility is to map the phase relation obtained in the residual band(s) to a global frequency independent phase relation value that is then used for the transient decorrelator. This results in the benefit that no additional transmission costs arise for the phase data, if non-full band residuals are transmitted anyway. However, it has to be considered, that the correctness of the phase estimate depends on the width of the frequency band(s) where residual signals are transmitted. The correctness of the phase estimates also depends on the consistency of the phase relation between the downmix and the residual signal along the frequency axis. For clearly transient signals, high consistency is usually encountered.

In a further embodiment, phase information is obtained in a decoder employing additional correction information transmitted from the encoder. Such an embodiment is similar to the two previous embodiments (phase from GES, phase from residuals), but additionally, it is useful to generate correction data in the encoder which is transmitted to the decoder. The correction data allows for reducing the phase estimation error that may occur in the two variants described before (phase from GES, phase from residuals). Furthermore, the correction data may be derived from estimating the decoder-side phase estimation error in the encoder. The correction data may be this (potentially coded) estimated estimation error. Furthermore, with respect to the phase-estimation-from-GES-data approach, the correction data may simply be the correct sign of the encoder-generated phase values. This allows generating phase terms with the correct sign in the decoder. The benefit of such an approach is that due to the correction data, the exactness of the phase information recoverable in the decoder is much closer to that of the encoder generated phase information. However, the entropy of the correction information is lower than the entropy of the correct phase information itself. Thus, the parameter bit rate is lowered when compared to directly transmitting the phase information obtained in the encoder.

In another embodiment, phase information/terms are obtained from a (pseudo-) random process in a decoder. The benefit of such an approach is that there is no need to transmit any phase information with high temporal resolution. This results in a reduced data rate. In an embodiment, a simple method is to generate phase values with a uniform random distribution in the range [−180°, 180°].

In a further embodiment, the statistical properties of the phase distribution in the encoder are measured. These properties are coded and then transmitted (at low time resolution) to the decoder. Random phase values are generated in the decoder which are subject to the transmitted statistical properties. These properties might be the mean, variants, or other statistical measures of the statistical phase distribution.

When more than one decorrelator instance is running in parallel (e.g., for a multichannel upmix), care has to be taken to ensure mutually decorrelated decorrelator outputs. In an embodiment, wherein multiple vectors of (pseudo-) random phase values (instead of a single vector) are generated for all but the first decorrelator instance, a set of vectors is selected that results in the least correlation of the phase value across all decorrelator instances.

In case of transmitting phase correction information from the encoder to the decoder, the data rate that may be used can be reduced as follows:

The phase correction information only needs to be available in the decoder as long as there are transient components in the signal to be decorrelated. The transmission of the phase correction information can thus be limited by the encoder such that only the useful information is transmitted to the decoder. This can be done by applying a transient detection in the encoder as has been described above. Phase correction information is only transmitted for points in time n, for which transients have been detected in the encoder.

Returning to the aspect of transient separation, in an embodiment, transient separation may be decoder driven.

In such an embodiment, transient separation information may also be obtained in the decoder, e.g., by applying a transient detection method as described in Andreas Walther, Christian Uhle, Sascha Disch "Using Transient Suppression in Blind Multi-channel Up-mix Algorithms," in Proc. 122nd AES Convention, Vienna, Austria, May 2007 to the downmix signal that is available in the spatial audio decoder before upmixing to a stereo or multichannel output signal. In this case, no transient information has to be transmitted, which saves transmission data rate.

However, performing the transient detection in decoding might cause issues when, e.g., standardizing the transient handling scheme: for example, it might be hard to find a transient detection algorithm which results in exactly the same transient detection results when being implemented on different architectures/platforms involving different numerical precisions, rounding schemes, etc. Such a predictable decoder behavior is often mandatory for standardization. Furthermore, the standardized transient detection algorithm might fail for some input signals, causing intolerable distortions in the output signals. It might then be difficult to correct the failing algorithm after standardization without building a decoder that is not conforming to the standard. This issue might be less severe if at least a parameter controlling the transient separation strength is transmitted at low time resolution (e.g., at the spatial parameter update rate of MPS) from the encoder to the decoder.

In a further embodiment, transient separation is also decoder driven and non-fullband residuals are transmitted. In this embodiment, the decoder driven transient separation may be refined by employing obtained phase estimates from transmitted non-fullband residuals (see above). Note that this refinement can be applied in the decoder without transmitting additional data from the encoder to the decoder.

In this embodiment, the phase terms that are applied in a transient decorrelator are obtained by extrapolating the correct phase values from the residual bands to frequencies where no residuals are available. One method is to calculate a (potentially e.g. signal power weighted) mean phase value from the phase values that can be calculated for those frequencies where residual signals are available. The mean phase value may then be applied as a frequency independent parameter in the transient decorrelator.

As long as the correct phase relation between the downmix and the residual is frequency independent, the mean phase value represents a good estimate of the correct phase value. However; in the case of a phase relation that is not consistent along the frequency axis, the mean phase value may be a less correct estimate, potentially leading to incorrect phase values and audible artifacts.

The consistency of the phase relation between the downmix and the transmitted residual along the frequency axis can therefore be used as a reliability measure of the extrapolated phase estimate that is applied in the transient decorrelator. To lower the risk of audible artifacts, the consistency measure obtained in the decoder may be used to control the transient separation strength in the decoder, e.g. as follows:

Transients, for which the corresponding phase information (i.e. the phase information for the same time index n) is consistent along frequency, are fully separated from the conventional decorrelator input and are fully fed into the transient decorrelator. Since large phase estimation errors are unlikely, the full potential of the transient handling is used.

Transients, for which the corresponding phase information is less consistent along frequency, are only partially separated, leading to a less prominent effect of the transient handling scheme.

Transients, for which the corresponding phase information is very inconsistent along frequency, are not separated, leading to the standard behavior of a conventional upmix system without the proposed transient handling. Thus, no artifacts due to large phase estimation errors can occur.

The consistency measures for the phase information may be deducted, e.g. from the (potentially signal power weighted) variance of standard deviation of the phase information along frequency.

Since only few frequencies may be available for which the residual signals are transmitted, the consistency measure may have to be estimated from only few samples along frequency, leading to a consistency measure that only seldom reaches extreme values ("perfectly consistent" or "perfectly inconsistent"). Thus, the consistency measure may be linearly or non-linearly distorted before being used to control the transient separation strength. In an embodiment, a threshold characteristic is implemented as illustrated in FIG. 8, right example.

Figure 8:
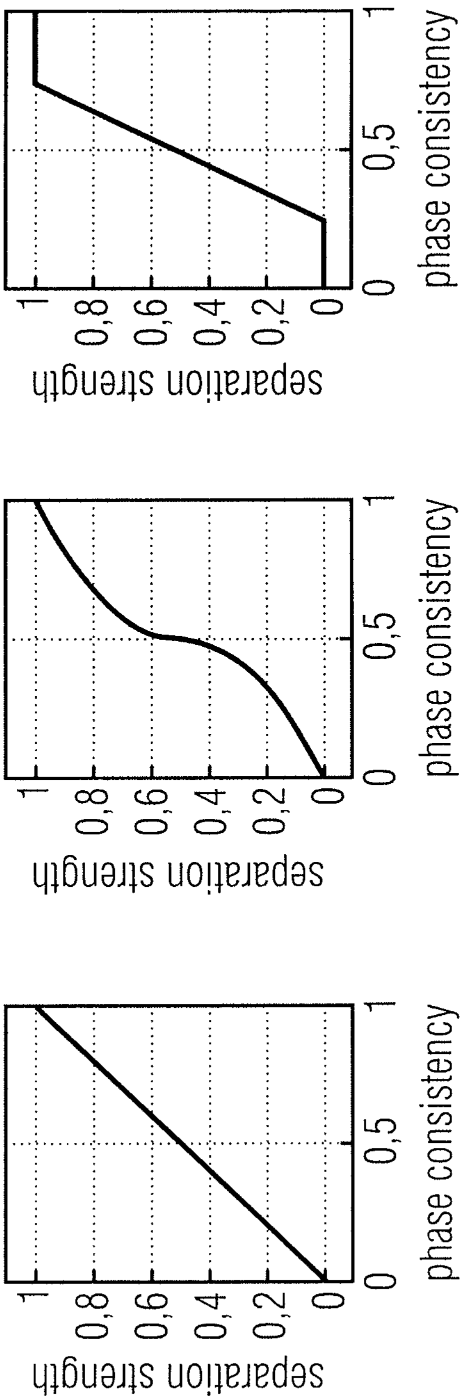
FIG. 8 illustrates exemplary mappings from phase consistency measures to a transient separation strength.

FIG. 8 depicts different exemplary mappings from phase consistency measures to transient separation strengths, illustrating the impact of the variants for obtaining transient handling parameters on the robustness to transient misclassification. The variants for obtaining the transient separation information and the phase information listed above differ in parameter data rate and therefore represent different operating points in term of overall bit rate of a codec implementing the proposed transient handling technique. Apart from this, the choice of the source for obtaining the phase information also affects aspects such as the robustness to false transient classifications: handling a non-transient signal as a transient causes much less audible distortions if the correct phase information is applied in the transient handling. Thus, a signal classification error causes less severe artifacts in the scenario of transmitted phase values when compared to the scenario of random phase generation in the decoder.

Figure 9:
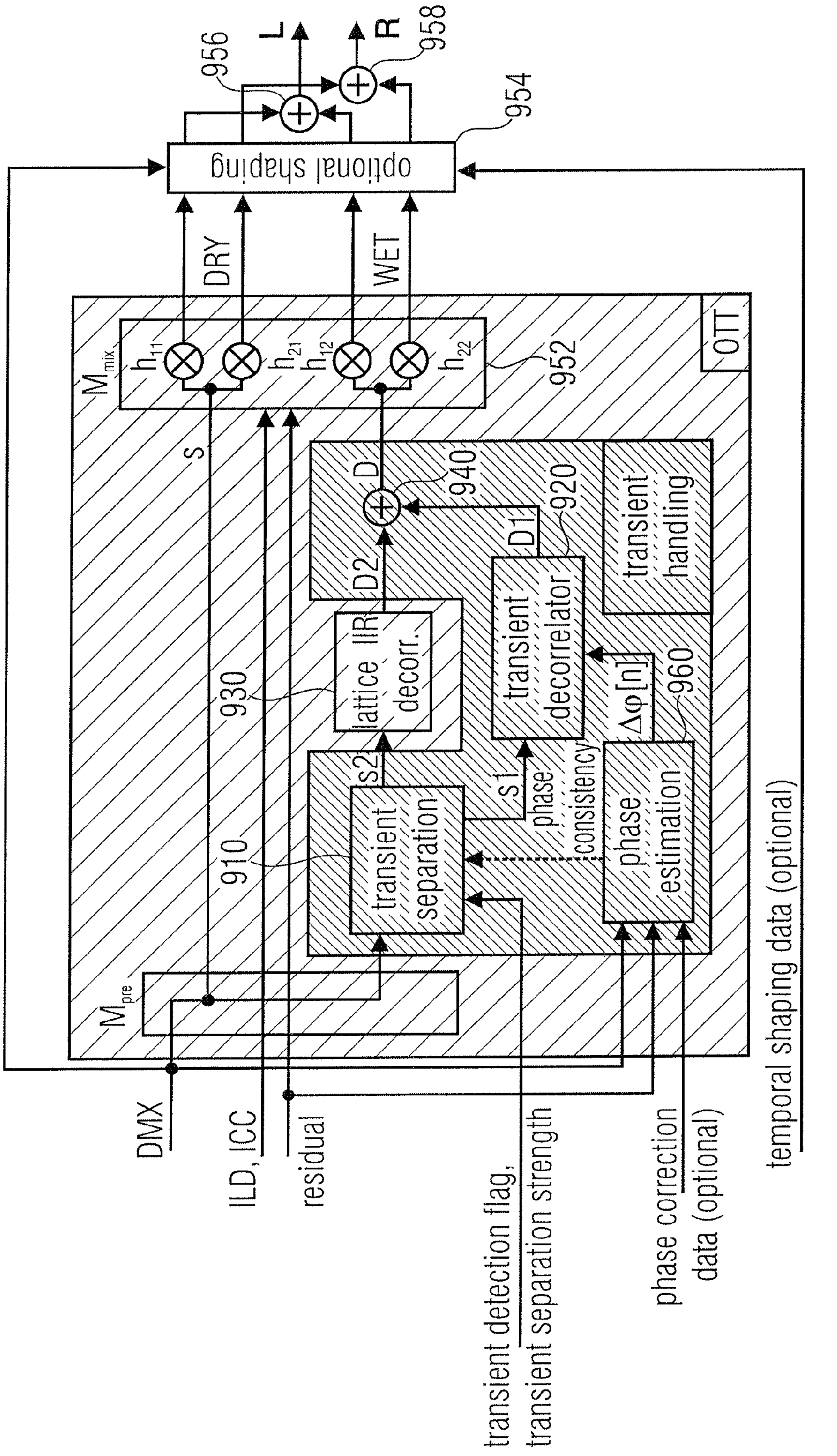
FIG. 9 is a one-to-two system overview according to another further embodiment.

FIG. 9 is a One-To-Two system overview with transient handling according to a further embodiment, wherein narrow band residual signals are transmitted. The phase data $\Delta\phi$ is estimated from the phase relation between the downmix (DMX) and the residual signal in the frequency band(s) of the residual signal. Optionally, phase correction data is transmitted to lower the phase estimation error.

FIG. 9 illustrates a transient separator 910, a transient decorrelator 920, a lattice IIR decorrelator 930, a combining unit 940, a mixer 952 an optional shaping unit 954, a first adding unit 956 and a second adding unit 958, which correspond to the transient separator 510, the transient decorrelator 520, the lattice IIR decorrelator 530, the combining unit 540, the mixer 552 the optional shaping unit 554, the first adding unit 556 and the second adding unit 558 of the embodiment of FIG. 5, respectively. The embodiment of FIG. 8 furthermore comprises a phase estimation unit 960. The phase estimation unit 960 receives an input signal DMX, a residual signal "residual" and optionally, phase correction data. Based on the received information the phase information unit calculates phase data $\Delta\phi$. Optionally, the phase estimation unit also determines phase consistency information and passes the phase consistency information to the transient separator 910. For example, the phase consistency information may be used by the transient separator to control the transient separation strength.

The embodiment of FIG. 9 applies the finding that if residuals are transmitted within the coding scheme in a non-full band fashion, the signal power weighted mean phase difference between the residual and the downmix ($\Delta\phi_{residual\_bands}$) may be applied as broadband phase information to the separated transients ($\Delta\phi=\Delta\phi_{low\ residual\_bands}$). In this case, no additional phase information has to be transmitted, lowering the bit rate demand for the transient handling. In the embodiment of FIG. 9, the phase estimate from the residual bands may considerably deviate from the more precise broadband phase estimate that is available in the encoder. An option is therefore to transmit phase correction data (e.g., $\Delta\phi_{correction}\ \Delta\phi-\Delta\phi_{residual\_bands}$) so that the correct $\Delta\phi$ are available in the decoder. However, since $\Delta\phi_{correction}$ may show a lower entropy than $\Delta\phi$, the useful parameter data rate may be lower than the rate that would be needed for transmitting $\Delta\phi$. (This concept is similar to the general use of prediction in coding: instead of coding data directly, a predication error with lower entropy is coded. In the embodiment of FIG. 9, the prediction step is the extrapolation of the phase from the residual frequency bands to non-residual bands). The consistency of the phase difference in the residual frequency bands ($\Delta\phi_{residual\_bands}$) along the frequency axis may be used to control the transient separation strength.

In embodiments, a decoder may receive phase information from an encoder, or the decoder may itself determine the phase information. Furthermore, the decoder may receive transient separation information from an encoder, or the decoder may itself determine the transient separation information.

In embodiments, an aspect of the transient handling is the application of the "semantic decorrelation" concept described in WO/2010/017967 together with the "transient decorrelator", which is based on multiplying the input with phase terms. The perceptual quality of rendered applause-like signals is improved since both processing steps avoid altering the temporal structure of transient signals. Furthermore, the spatial distribution of transients as well as phase relations between the transients is reconstructed in the output channels. Furthermore, embodiments are also computationally efficient and can readily be integrated into PS- or MPS-like upmix systems. In embodiments, the transient handling does not affect the mixing matrix process, so that all spatial rendering properties that are defined by the mixing matrix are also applied to the transient signal.

In embodiments, a novel decorrelation scheme is applied which is particularly suited for the application in upmix systems, which is particularly suited to the application of spatial audio coding schemes like PS or MPS and which improves the perceptual quality of the output signals in the case of applause-like signals, i.e. signals that contain dense mixtures of spatially distributed transients and/or may be seen as a particularly enhanced implementation of the generic "semantic decorrelation" framework. Furthermore, in embodiments a novel decorrelation scheme is comprised that reconstructs the spatial/temporal distribution of the transients similar to the distribution in the original signal, preserves the temporal structure of the transient signals, allows for varying the bit rate versus quality trade-off and/or is ideally suited for a combination with MPS features like non-full-band residuals or GES. The combinations are complementary, i.e.: information of standard MPS features is reused for the transient handling.

Figure 10:
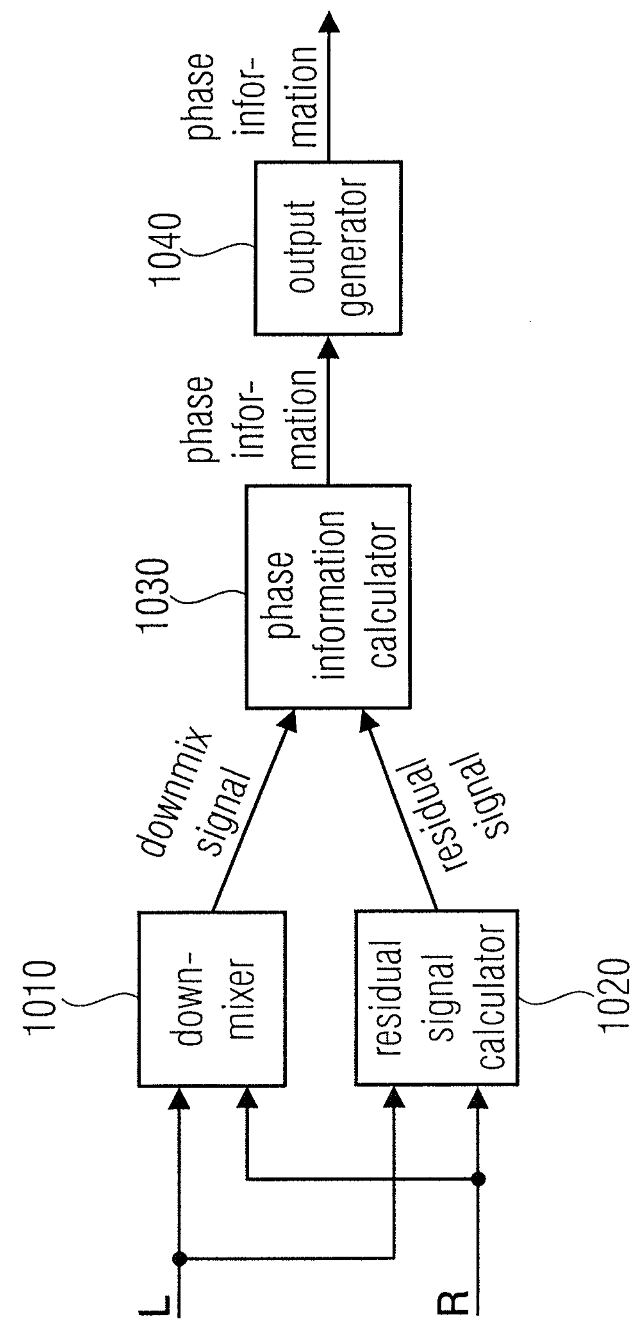
FIG. 10 illustrates an apparatus for encoding an audio signal having a plurality of channels according to an embodiment.

FIG. 10 illustrates an apparatus for encoding an audio signal having a plurality of channels. Two input channels L, R are fed into a downmixer 1010 and into a residual signal calculator 1020. In other embodiments, a plurality of channels is fed into the downmixer 1010 and the residual signal calculator 1020, e.g., 3, 5 or 9 surround channels. The downmixer 1010 then downmixes the two channels L, R, to obtain a downmix signal. For example, the downmixer 1010 may employ a mixing matrix and conduct a matrix multiplication of the mixing matrix and the two input channels L, R, to obtain the downmix signal. The downmix signal may be transmitted to a decoder.

Furthermore, the residual signal generator 1020 is adapted to calculate a further signal which is referred to as residual signal. Residual signals are signals which can be used to regenerate the original signals by additionally employing the downmix signal and an upmix matrix. When, for example, N signals are downmixed to 1 signal, the downmix is typically 1 of the N components which result from the mapping of the N input signals. The remaining components resulting from the mapping (e.g., N−1 components) are the residual signals and allow reconstructing the original N signals by an inverse mapping. The mapping may, for example, be a rotation. The mapping shall be conducted such that the downmix signal is maximized and the residual signals are minimized, e.g., similar as a principal axis transformation. E.g., the energy of the downmix signal shall be maximized and the energies of the residual signals shall be minimized. When downmixing 2 signals to 1 signal, the downmix is normally one of the two components which result from the mapping of the 2 input signals. The remaining component resulting from the mapping is the residual signal and allows reconstructing the original 2 signals by an inverse mapping.

In some cases, the residual signal may represent an error associated with representing the two signals by their downmix and associated parameters. For example, the residual signal may be an error signal which represents the error between original channels L, R and channels L', R', resulting from upmixing the downmix signal that was generated based on the original channels L and R.

In other words, a residual signal can be considered as a signal in the time domain or a frequency domain or a subband domain, which together with the downmix signal alone or with the downmix signal and parametric information allows a correct or nearly correct reconstruction of an original channel. Nearly correct has to be understood that the reconstruction with the residual signal having an energy greater than zero is closer to the original channel compared to a reconstruction using the downmix without the residual signal or using the downmix and the parametric information without the residual signal.

Furthermore, the encoder comprises a phase information calculator 1030. The downmix signal and the residual signal are fed into the phase information calculator 1030. The phase information calculator then calculates information on a phase difference between the downmix and the residual signal to obtain phase information. For example, the phase information calculator may apply functions that calculate a cross-correlation of the downmix and the residual signal.

Moreover, the encoder comprises an output generator 1040. The phase information generated by the phase information calculator 1030 is fed into the output generator 1040. The output generator 1040 then outputs the phase information.

In an embodiment the apparatus further comprises a phase information quantizer for quantizing the phase information. The phase information generated by the phase information calculator may be fed into the phase information quantizer. The phase information quantizer then quantizes the phase information. For example, the phase information may be mapped to 8 different values, e.g., to one of the values 0, 1, 2, 3, 4, 5, 6 or 7. The values may represent the phase differences 0, $\pi/4$, $\pi/2$, $3\pi/4$, $\pi$, $5\pi/4$, $3\pi/2$ and $7\pi/4$, respectively. The quantized phase information may then be fed into the output generator 1040.

In a further embodiment, the apparatus moreover comprises a lossless encoder. The phase information from the phase information calculator 1040 or the quantized phase information from the phase information quanztizer may be fed into the lossless encoder. The lossless encoder is adapted to encode phase information by applying lossless encoding. Any kind of lossless coding scheme may be employed. For example, the encoder may employ arithmetic coding. The lossless encoder then feeds the losslessly encoded phase information into the output generator 1040.

With respect to the decoder and encoder and the methods of the described embodiments the following is mentioned:

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for decoding a signal comprising:

a transient separator for separating an apparatus input signal into a first signal component and into a second signal component such that the first signal component comprises transient signal portions of the input signal and such that the second signal component comprises non-transient signal portions of the input signal;

a transient decorrelator for decorrelating the first signal component according to a first decorrelation method to acquire a first decorrelated signal component;

a further second decorrelator for decorrelating the second signal component according to a second decorrelation method to obtain a second decorrelated signal component, wherein the second decorrelation method is different from the first decorrelation method;

a combining unit for combining the first decorrelated signal component and the second decorrelated signal component to acquire a decorrelated combination signal; and a mixer, being adapted to receive mixer input signals and being adapted to generate output signals based on the mixer input signals and a mixing rule;

wherein the combining unit and the mixer are arranged so that the decorrelated combination signal is fed into the mixer as a first mixer input signal and that the apparatus input signal or a signal derived from the apparatus input signal is fed into the mixer as a second mixer input signal.

2. The apparatus according to claim 1, wherein the mixer is furthermore adapted to receive correlation/coherence parameter data indicating a correlation or coherence between two signals and wherein the mixer is furthermore adapted to generate the output signals based on the correlation/coherence parameter data.

3. The apparatus according to claim 1, wherein the mixer is furthermore adapted to receive level difference parameter data indicating an energy difference between two signals and wherein the mixer is furthermore adapted to generate the output signals based on the level difference parameter data.

4. The apparatus according to claim 1, wherein the mixer is adapted to employ a mixing rule which comprises a rule to multiply the first and second mixer input signal by a mixing matrix.

5. The apparatus according to claim 1, wherein the combining unit is adapted to combine the first decorrelated signal component and the second decorrelated signal component by adding the first decorrelated signal component and the second decorrelated signal component.

6. The apparatus according to claim 1, wherein the transient separator is adapted to either feed a considered signal portion of the apparatus input signal into the transient decorrelator or to feed the considered signal portion into the second decorrelator depending on transient separation information which either indicates that the considered signal portion comprises a transient or which indicates that the considered signal portion does not comprise a transient.

7. The apparatus according to claim 1, wherein the transient separator is adapted to partially feed a considered signal portion of the apparatus input signal into the transient decorrelator and to partially feed the considered signal portion into the second decorrelator, and wherein an amount of the considered signal portion that is fed into the transient separator and an amount of the considered signal portion that is fed into the second decorrelator depend on transient separation information.

8. The apparatus according to claim 1, wherein the transient separator is adapted to separate an apparatus input signal which is represented in a frequency domain.

9. The apparatus according to claim 1, wherein the transient separator is adapted to separate the apparatus input signal into a first signal component and into a second signal component based on a frequency independent transient separation information.

10. The apparatus according to claim 1, wherein the transient separator is adapted to separate the apparatus input signal into a first signal component and into a second signal component based on a frequency dependent transient separation information.

11. The apparatus according to claim 1, wherein the apparatus furthermore comprises a receiving unit which is adapted to receive phase information from an encoder; and wherein the transient decorrelator is adapted to apply the phase information from the encoder to the first signal component.

12. The apparatus according to claim 1, wherein the second decorrelator is a lattice IIR decorrelator.

13. A method for decoding a signal comprising:

separating an apparatus input signal into a first signal component and into a second signal component such that the first signal component comprises transient signal portions of the apparatus input signal and such that the second signal component comprises non-transient signal portions of the apparatus input signal;

decorrelating the first signal component by a transient decorrelator according to a first decorrelation method to acquire a first decorrelated signal component;

decorrelating the second signal component by a further second decorrelator according to a second decorrelation method to acquire a second decorrelated signal component, wherein the second decorrelation method is different from the first decorrelation method;

combining the first decorrelated signal component and the second decorrelated signal component to acquire a decorrelated combination signal; and generating output signals based on a mixing rule, the decorrelated combination signal and the apparatus input signal.

14. A non-transitory computer-readable medium comprising a computer program implementing a method for decoding a signal, said method comprising:

separating an apparatus input signal into a first signal component and into a second signal component such that the first signal component comprises transient signal portions of the apparatus input signal and such that the second signal component comprises non-transient signal portions of the apparatus input signal;

decorrelating the first signal component by a transient decorrelator according to a first decorrelation method to acquire a first decorrelated signal component;

decorrelating the second signal component by a further second decorrelator according to a second decorrelation method to acquire a second decorrelated signal component, wherein the second decorrelation method is different from the first decorrelation method;

combining the first decorrelated signal component and the second decorrelated signal component to acquire a decorrelated combination signal; and generating output signals based on a mixing rule, the decorrelated combination signal and the apparatus input signal.

* * * * *